United States Patent
Wiederien et al.

(10) Patent No.: US 11,698,232 B1
(45) Date of Patent: Jul. 11, 2023

(54) SYSTEM AND METHOD UTILIZING THERMOCHEMICAL ENERGY STORAGE FOR ABATEMENT OF VOLATILE ORGANIC COMPOUNDS

(71) Applicant: DRESSER-RAND COMPANY, Houston, TX (US)

(72) Inventors: Richard J. Wiederien, Bellevue, WA (US); Joseph T. Williams, Kirkland, WA (US); Enrique J. Mora, Winter Springs, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 17/671,820

(22) Filed: Feb. 15, 2022

(51) Int. Cl.
F28D 20/00 (2006.01)
F23G 7/06 (2006.01)
F23C 99/00 (2006.01)

(52) U.S. Cl.
CPC .......... *F28D 20/0034* (2013.01); *F23C 99/00* (2013.01); *F23G 7/06* (2013.01)

(58) Field of Classification Search
CPC .......... F28D 20/003; F23G 7/06; F23C 99/00; F23C 2900/99008
See application file for complete search history.

(56) References Cited

U.S. PATENT DOCUMENTS

| | | | |
|---|---|---|---|
| 5,914,091 A | | 6/1999 | Holst et al. |
| 6,126,913 A | * | 10/2000 | Martin ............ B01J 8/025 431/170 |
| 7,094,388 B2 | | 8/2006 | Ryan |
| 8,776,734 B1 | | 7/2014 | Roy et al. |
| 9,500,144 B1 | | 11/2016 | Steen et al. |
| 9,726,373 B2 | | 8/2017 | Nakayama et al. |
| 2004/0147798 A1 | | 7/2004 | MacWhinnie et al. |
| 2020/0018214 A1 | | 1/2020 | Han et al. |

FOREIGN PATENT DOCUMENTS

| CN | 110553275 A | * 12/2019 | ............ F23G 7/063 |
|---|---|---|---|
| WO | 2009014512 A1 | 1/2009 | |
| WO | 2020146361 A1 | 7/2020 | |

OTHER PUBLICATIONS

Liu Qingshan et al., "Thermodynamic and parametric analyses of a thermoelectric generator in a liquid air energy storage system", Energy Conversion and Management, Elsevier Science Publishers, Oxford, GB, vol. 237, Apr. 12, 2021 (Apr. 12, 2021), XP086577915, ISSN: 0196-8904, DOI: 10.1016/JENCONMAN.2021.114117/Apr. 12, 2021.

(Continued)

*Primary Examiner* — Eric S Ruppert

(57) ABSTRACT

System and method utilizing thermochemical energy storage for abatement of volatile organic compounds (VOCs) are provided. The system includes a thermochemical energy storage module cyclically operable in a discharging cycle and in a charging cycle. Abatement of VOCs may be performed in either cycle. Disclosed embodiments are expected to provide a zero-added carbon VOC abatement system that in certain situations can operate uninterruptedly 24/7 with the flexibility to facilitate consumption of energy during periods of inexpensive rates for electricity.

20 Claims, 3 Drawing Sheets

(56) References Cited

OTHER PUBLICATIONS

Wherrett M. R. et al., "VOC emissions from industrial painting processes as a source of fuel cell energy", Metal Finishing: Devoted Exclusively to metallic surface treatments, Elsevier, New York, NY, US, vol. 102, No. 10, Oct. 1, 2004 (Oct. 1, 2004) pp. 23-29, XP004649153, ISSN: 0026-0576, DOI: 10.1016 S0026-0576(04)84644-0.

Krishnamurthy Anirudh et al., "Abatement of gaseous volatile organic compounds: A process perspective", Catalysis Today, Elsevier, Amsterdam, NL, vol. 350, Jun. 3, 2019 (Jun. 3, 2019) pp. 100-119, XP086192508, ISSN: 0920-5861, DOI: 10.1016/J.CATTOD.2019.05.069/Jun. 3, 2019.

PCT International Search Report and Written Opinion of the International Searching Authority dated May 4, 2023 corresponding to PCT Application No. PCT/US2023/011399 filed Jan. 24, 2023.

\* cited by examiner

SYSTEM AND METHOD UTILIZING THERMOCHEMICAL ENERGY STORAGE FOR ABATEMENT OF VOLATILE ORGANIC COMPOUNDS

BACKGROUND

The present disclosure relates to thermochemical energy storage, and, more particularly, to system and method utilizing thermochemical energy storage for abatement of volatile organic compounds (VOCs).

VOCs are chemical compounds that constitute a substantial source of air pollution in a wide range of industries. Due to their role as ozone precursors and/or toxicity, VOC emissions are problematic. Accordingly, many jurisdictions around the world set out ever more tighter regulations for regulating emissions of VOCs.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
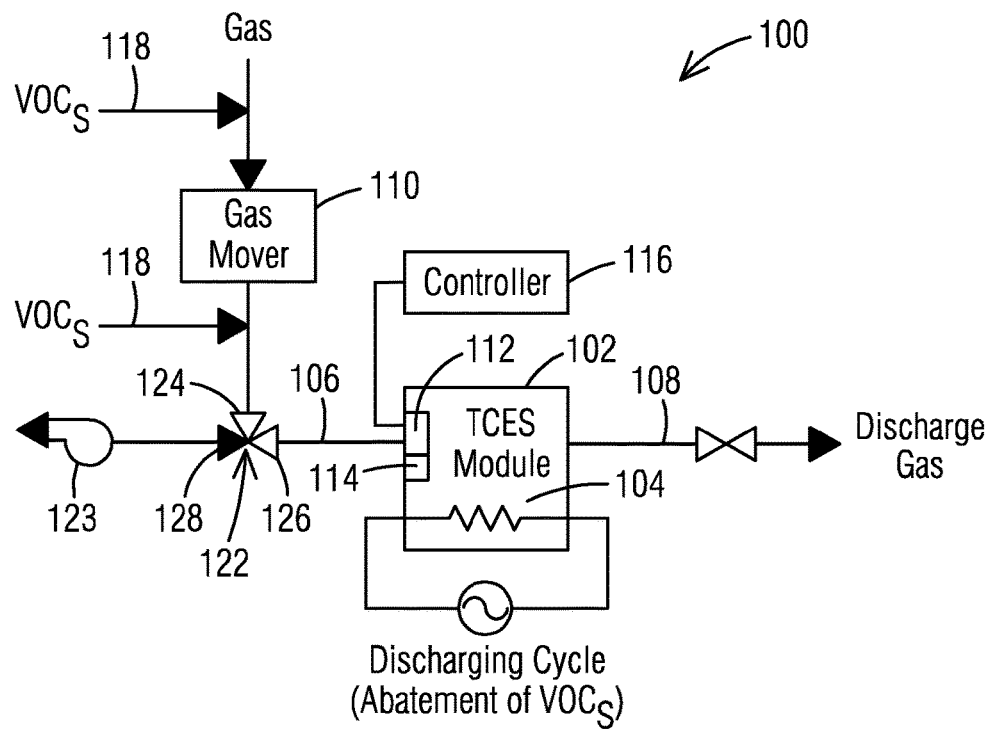
FIG. 1 is block diagram of a disclosed system utilizing a thermochemical energy storage module, which is schematically shown in a discharging cycle and is effective for abatement of VOCs.

Before any disclosed embodiments are explained in detail, it is to be understood that disclosed embodiments are not limited to the details of construction and the arrangement of components and/or the operational relationships set forth in this description or illustrated in the following drawings. The scope of the disclosure in its broadest form may be practiced or may be carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout.

The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

It should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described regarding one embodiment are equally applicable to other embodiments absent a specific statement to the contrary. That is, disclosed embodiments need not be construed as mutually exclusive embodiments, since aspects of such disclosed embodiments may be appropriately combined by one skilled in the art depending on the needs of a given application.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

The inventors of concepts embodied in the present disclosure have recognized that decarbonization of energy production, increase of energy efficiency and emission reductions are basic objectives of several policy initiatives to achieve ambitious climate targets in the next few years. In the evolution of energy production, renewable energy sources play a major role towards achieving environmental sustainability.

The inventors recognize the flexibility of thermal energy storage to, for example, accommodate daily and seasonal imbalances in energy consumption and production and in turn being able to provide cost-effective integration of renewable energy, power grid flexibility and power sector decarbonization contributing to a better utilization of existing assets of energy production in combination with the growing penetration of renewable energy sources into the electricity supply mix.

Thermal energy storage systems are effective to provide flexibility to the power grid by providing flexibility toward demand-side management strategies. For instance, Power-to-heat (PtH) technology, based on the conversion of electricity into heat and its counterpart, Heat-to-Power (HtP), are technologies that can provide substantial flexibility toward the implementation of demand-side management strategies. For example, turning surplus of variable renewable electricity (VRE) into heat to be stored as thermal or chemical energy during off-peak times, and then using the stored heat or chemical energy during peak-hours to generate electricity can be effective to flattening the customer's load profile and in turn effective to realize win-win strategies to everyone involved. For example, enabling customers to take advantage of variable electricity prices during peak and off-peak periods and effective for utilities to spread the demand over the entire day.

In addition to the foregoing considerations, the present inventors have further recognized an innovative utilization of thermochemical energy for abating emissions of VOCs, and capable of providing flexibility toward demand-side management strategies. For example, disclosed embodiments are expected to provide a zero-added carbon VOC abatement system that in certain situations can operate uninterruptedly 24/7 with the flexibility to facilitate consumption of energy during periods of inexpensive rates for electricity.

In one disclosed embodiment, as illustrated in FIG. 1, a system 100 includes a thermochemical energy storage (TCES) module 102 cyclically operable in a discharging cycle and in a charging cycle. Thermochemical energy storage module has a chamber 104 in fluid communication with a first chamber port 106 and a second chamber port 108.

The main principle of thermochemical energy storage is based on a reversible chemical reaction that may be expressed as C+heat⇌A+B; where C is the thermochemical material for the reversible reaction and A and B are reactants. This reaction may take many forms where C may include one or more materials or species, and A+B may include one or more materials or species. The reaction may be either dissociative (splitting species) or associative (combining species). The description below is meant to provide background information in connection with certain basic theoretical underpinnings of involved processes.

Charging Cycle: The charging cycle is endothermic. Thermal energy is applied from an energy source, which could be a renewable energy source and/or a traditional carbon-based or nuclear-based energy source. The applied thermal energy is used for dissociation or association of the thermochemical reaction material and is equivalent to the heat of reaction or enthalpy of formation. After this cycle, the reactants (e.g., A and B in the reaction equation above) are formed. In disclosed embodiments, the thermochemical material is selected so that one of the reactants is $O_2$. The charging reaction in the example shown can be expressed as:

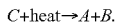

$C+\text{heat} \rightarrow A+B.$

Discharging Cycle: During this cycle, for the example reaction listed, the reactants A and B are combined in an exothermic reaction. The energy released from this reaction permits the stored thermochemical energy to be recovered. After discharging, the thermochemical reaction material C is regenerated so that it can be used again in further cycles. The discharging reaction can be expressed as:

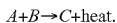

$A+B \rightarrow C+\text{heat}.$

The description below proceeds to elaborate in the context of disclosed embodiments.

In the discharging cycle (FIG. 1), a gas mover 110 is fluidly coupled to first chamber port 106 to supply into chamber 104 a flow of gas, such as air or any oxygen-carrying gas, containing volatile organic compounds having a first concentration. Depending on the needs of a given application, gas mover 110 may be a gas blower or may be a compressor. By way of example, gas blowers may be used in applications involving a moderate pressure ratio (e.g., the ratio of discharge pressure over inlet pressure), such as in a range from approximately 1.1 to approximately 1.2. By way of comparison, compressors may be used in applications involving relatively high-pressure ratios, such as above approximately 2.0 and that, for example, in applications involving multiple stages can permit an overall pressure ratio reaching up to approximately 30:1 or higher.

In the discharging cycle, the volatile organic compounds are subjected to destructive thermal oxidation in response to thermal energy discharged by thermochemical energy storage module 102 so that discharge gas having a second concentration of the volatile organic compounds exits from chamber 104 by way of second chamber port 108, where the second concentration is less than the first concentration. For example, the second concentration of VOCs is sufficiently low to meet any applicable regulations controlling the discharge of VOCs to the environment. In general, the allowable discharge concentration of the VOCs would be set by the applicable regulatory requirements and the allowable inlet concentration of the VOCs could, for example, be set based on the specific characteristics of the respective thermochemical energy storage modules being used in a given implementation. For example, a selection of a feed rate of the VOCs for a given application may be appropriately tailored to meet the applicable regulatory requirements while maintaining appropriate integrity of the thermochemical energy storage medium being used in the given application.

In one non-limiting embodiment, chamber 104 is sized to obtain a residence time effective for the thermal oxidation of the volatile organic compounds. As would be appreciated by those skilled in the art, the nominal residence time of the flow of gas in chamber 104 can be defined as the volume of chamber 104 divided by the volumetric flow rate of the gas.

In one non-limiting embodiment, a flow meter 112 and a flow valve 114 are in fluid communication with chamber 104, and a controller 116 is coupled to flow meter 112 and to flow valve 114 to control a rate of the flow of gas based on the residence time. By way of example, the residence time may be in a range from 0.5 second to 30 seconds. In another example, the residence time may be in a range from 1 second to 15 seconds.

An inlet 118 may be used to introduce the volatile organic compounds into the flow of gas. In certain applications inlet 118 may be disposed upstream of gas mover 110, and in other applications inlet 118 may be disposed downstream of gas mover 110. For example, in applications where some of the compressed air from the compressor is used for cooling of turbomachinery components, then in such applications it may not be desirable to have VOCs in the cooling air, and consequently in such applications inlet 118 should be disposed downstream of the compressor.

In the charging cycle (FIG. 2), a thermal energy source 120 (e.g., an electric heater, solar-based energy source, etc.) is in thermal communication with chamber 104 to supply thermal energy, and a suction gas mover 123 is fluidly coupled to first chamber port 106 to admit into chamber 104 through second chamber port 108 a flow of gas, such as air or any oxygen-carrying gas. In the charging cycle, like in the discharging cycle, depending on the needs of a given application, the flow of gas could contain volatile organic compounds having the first concentration to be subjected to destructive thermal oxidation in response to the generated thermal energy so that discharge gas having the second concentration of the volatile organic compounds exits from the chamber by way of first chamber port 106.

Figure 3:
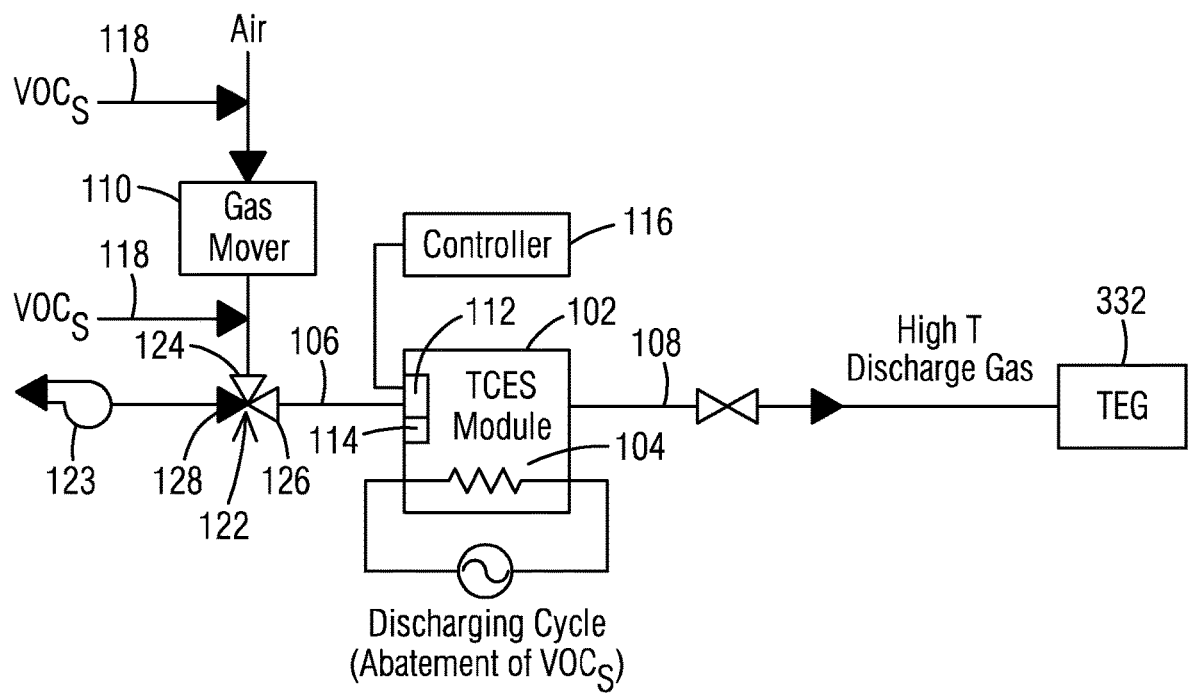
FIG. 3 is block diagram of a disclosed system with the thermochemical energy storage module, schematically shown in the discharging cycle and connected to supply high-temperature discharge gas to a power generating apparatus, such as a thermoelectric generator.

As shown in FIG. 1, a multi-port valve 122 has a first valve port 124, a second valve port 126 and a third valve port 128. In the discharging cycle, multi-port valve 122 is operable so that the first valve port 124 is open to pass the flow of gas to the second valve port 126 and in turn the second valve port 126 is open to pass the flow of gas into chamber 104 via the first chamber port 106, and the third valve port 128 is closed. In the figures, a respective darkened triangle in connection with a respective valve port schematically indicates a shut-off condition of the respective valve port and a respective clear triangle in connection with the respective valve port indicates an open condition of the respective valve port. As shown in FIG. 3 and in FIG. 4, the second chamber port 108 may be connected to an inlet 130 of a power generating apparatus to supply the discharge gas. In one non-limiting embodiment, the temperature of the discharge gas is in a range from 1000° C. to 1500° C.

Figure 4:
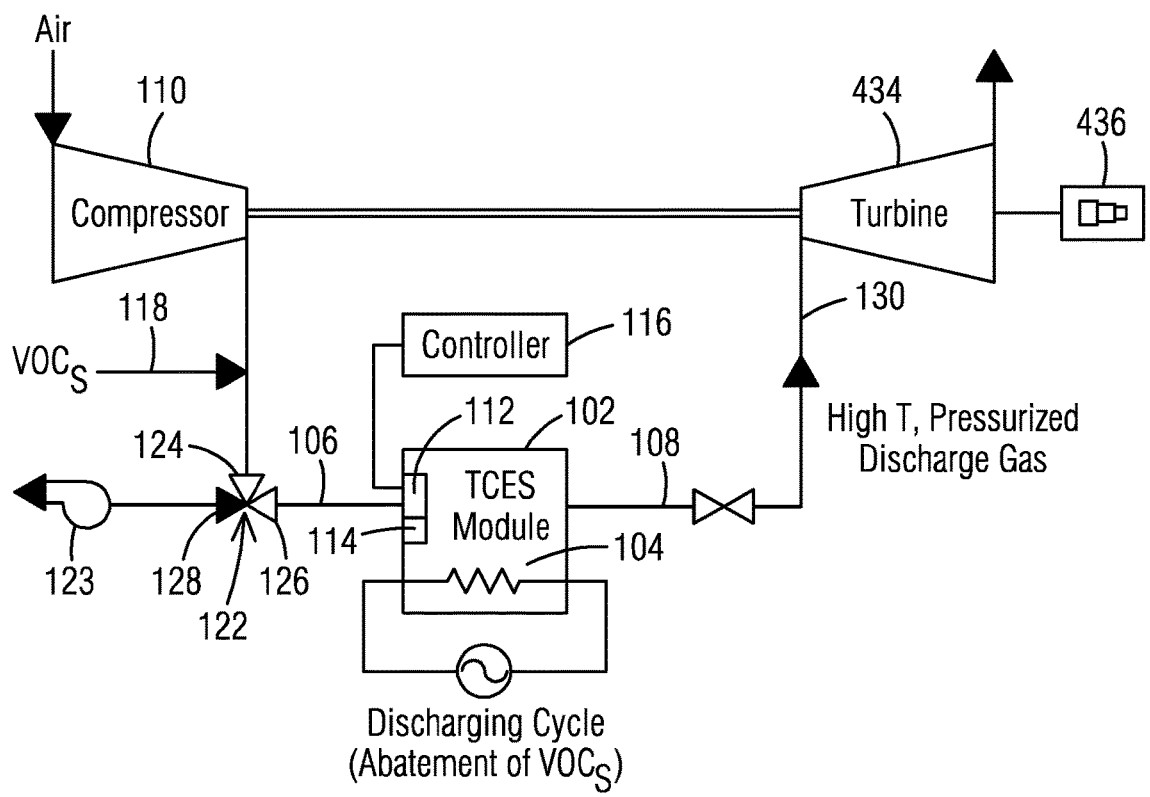
FIG. 4 is block diagram of a disclosed system with the thermochemical energy storage module, schematically shown in the discharging cycle and connected to supply high-temperature, pressurized discharge gas to a turbomachine.

The power generating apparatus may be a thermoelectric generator (TEG) 332 (FIG. 3) or may be a turbomachine 434 (FIG. 4). As will be appreciated by one skilled in the art, the TEG, also referred to in the art as a Seebeck generator, is a solid state device that converts heat flux (e.g., temperature differences) directly into electrical energy through the phenomenon called the Seebeck effect (a form of thermoelectric effect), as compared to power generation involving chemical or nuclear fuels, where, for example, turbomachine 434 would first convert heat into kinetic energy to, for example, propel an electromagnetic power generator 436.

Figure 2:
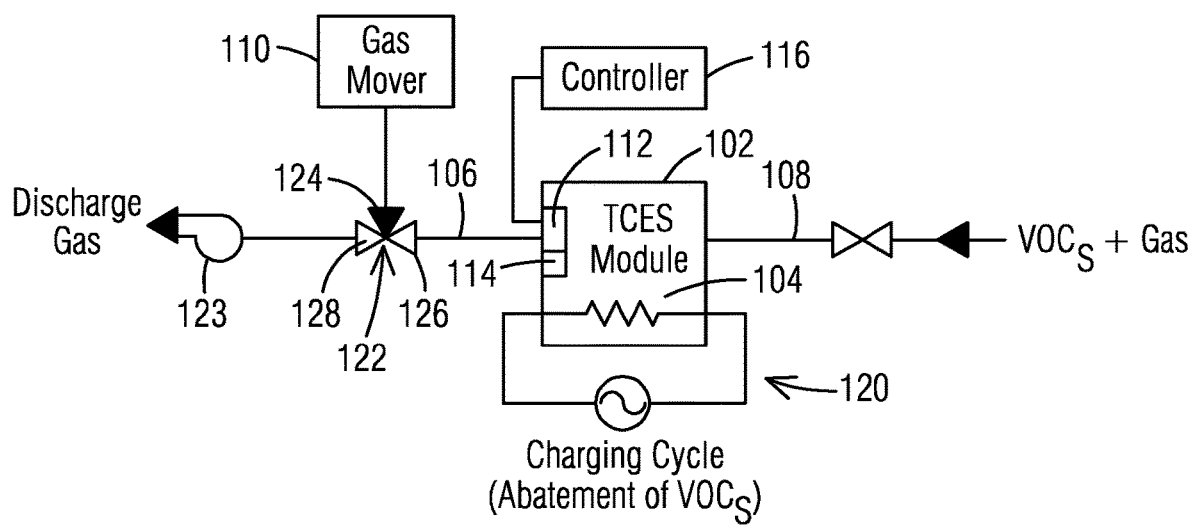
FIG. 2 is block diagram of a disclosed system with the thermochemical energy storage module, which in this case is schematically shown in a charging cycle and is also effective for abatement of VOCs during the charging cycle, if so desired.

As shown in FIG. 2, in the charging cycle, multi-port valve 122 is operable so that the first valve port 124 is closed, the second valve port 126 is open and connected to the first chamber port 106 to pass from chamber 104 to the third valve port 128 a flow of discharge gas, and in turn the third valve port 128 is connected to suction gas mover 123.

Figure 5:
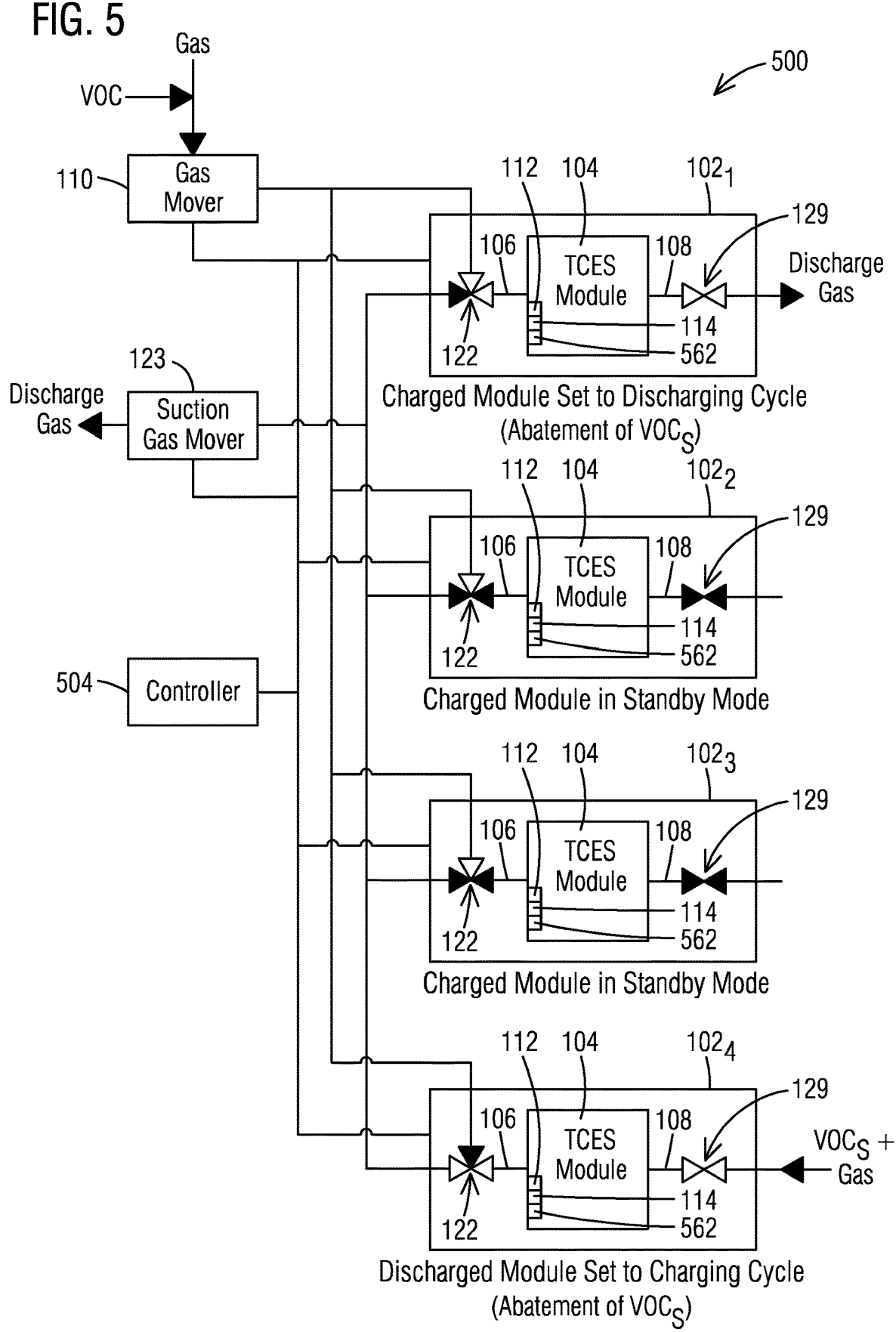
FIG. 5 is block diagram of a disclosed system utilizing a plurality of thermochemical energy storage modules where individual modules can be selectively set to operate in the charging cycle, in the discharging cycle, or in a charged standby mode, and collectively, uninterruptedly can provide 24/7 abatement of VOCs together with the flexibility of consuming electrical energy during periods when relatively lower rates of electricity are available.

FIG. 5 is block diagram of a disclosed system 500 utilizing a plurality of thermochemical energy storage modules, such as modules $102_1$ through $102_4$, where individual thermochemical energy storage modules can be selectively set to operate in the charging cycle, in the discharging cycle, or in a charged standby mode, and collectively, uninterruptedly can provide 24/7 abatement of VOCs together with the flexibility of consuming electrical energy during periods when relatively lower rates of electricity are available. It will be appreciated that the number of thermochemical energy storage modules may be adjusted based on the needs of a given application and therefore the number of thermochemical energy storage modules shown in FIG. 5 should be construed just as one example.

Each of thermochemical energy storage modules $102_1$ through $102_4$ is connected in parallel to gas mover 110. Additionally, each of thermochemical energy storage modules $102_1$ through $102_4$ is connected in parallel to suction gas mover 123, separate from the connections to gas mover 110. Each thermochemical energy storage module has a respective chamber 104 in fluid communication with a respective first chamber port 106 and a respective second chamber port 108. A respective depletion status of each of the thermochemical energy storage modules $102_1$ through $102_4$ may be monitored by way of a monitor 502.

Based on the results of the monitoring, a controller 504 is configured to execute at least one of the following: 1) setting a respective one of the thermochemical energy storage modules that is discharged to a charging cycle till a charged condition is reached and 2) setting another respective one of the thermochemical energy storage modules that is charged to a discharging cycle till a discharged condition is reached. For example, let us presume the monitor 502 of thermochemical energy storage module $102_1$ indicates that thermochemical energy storage module $102_1$ is in a charged condition, then thermochemical energy storage module $102_1$ may set to the discharging cycle and abate VOCs till a discharged condition is reached. That is, the gas mover 110 is fluidly coupled to the respective first chamber port 106 of thermochemical energy storage module $102_1$ to supply into the respective chamber 104 of thermochemical energy storage module $102_1$ a flow of gas containing volatile organic compounds having a first concentration. In this case, the volatile organic compounds would be subjected to destructive thermal oxidation in response to thermal energy discharged by thermochemical energy storage module $102_1$ so that discharge gas having a second concentration of the volatile organic compounds exits from the chamber 104 by way of the respective second chamber port 108 of thermochemical energy storage module $102_1$, where the second concentration is less than the first concentration.

Additionally, let us presume the respective monitor 502 of thermochemical energy storage module $102_4$ indicates that thermochemical energy storage module $102_4$ is in a discharged condition, then thermochemical energy storage module $102_4$ may be set to the charging cycle and, if so desired, performing abatement of VOCs till a charged condition is reached. That is, a thermal energy source would be coupled to the respective chamber 104 of thermochemical energy storage module $102_4$ to apply thermal energy. The suction gas mover 123 would be fluidly coupled to the first chamber port 106 of thermochemical energy storage module $102_4$ to admit into the chamber 104 through the second chamber port 108 of thermochemical energy storage module $102_4$ a flow of gas containing volatile organic compounds at the first concentration, where the volatile organic compounds would be subjected to destructive thermal oxidation in response to the applied thermal energy so that discharge gas having the second concentration of the volatile organic compounds exits from the chamber 104 by way of the respective first chamber port 106 of thermochemical energy storage module $102_4$. It will be appreciated that the setting of the respective one of the thermochemical energy storage modules $102_1$ through $102_4$ to the charging cycle may be further based on a variable economic cost associated with the charging cycle for a given time of day. For example, the thermochemical energy storage module $102_4$ may be set to the charging cycle when module $102_4$ is in a discharged condition and the time of day indicates availability of an inexpensive rate for electricity.

The monitoring of the respective depletion status of each of the thermochemical energy storage modules $102_1$ through $102_4$ may be continued. Based on the results of the continued monitoring, the controller 504 is configured to execute at least one of the following: setting a further one of the thermochemical energy storage modules $102_1$ through $102_4$ that is discharged to a charging cycle till a charged condition is reached and setting another further one of the thermochemical energy storage modules $102_1$ through $102_4$ that is charged to a discharging cycle till a discharged condition is reached. Let us presume, modules $102_2$ are $102_3$ is each in a respective charged condition (e.g., a charged standby or idle mode), then either of these modules could be set, if so desired, from the charged standby mode to the discharging cycle and so on and so forth. In the standby mode of a respective thermochemical energy storage module, multi-port valve 122 and a valve 129 connected to second chamber port 108 of the respective thermochemical energy storage module would be respectively set to respective shut-off states so that first chamber port 106 and second chamber port 108 provide no fluid communication to the chamber 104 of the respective thermochemical energy storage module. That is, the respective thermochemical energy storage module charged in the standby mode will continue to store the thermochemical energy till activated to the discharging cycle.

Although an exemplary embodiment of the present disclosure has been described in detail, those skilled in the art will understand that various changes, substitutions, variations, and improvements disclosed herein may be made without departing from the scope of the disclosure in its broadest form.

None of the description in the present application should be read as implying that any particular element, step, act, or function is an essential element, which must be included in the claim scope. The scope of patented subject matter is defined only by the allowed claims. Moreover, none of these claims are intended to invoke a means plus function claim construction unless the exact words "means for" are followed by a participle.

What is claimed is:

1. A system comprising:
   a thermochemical energy storage module cyclically operable in a discharging cycle and in a charging cycle, the thermochemical energy storage module having a chamber in fluid communication with a first chamber port and a second chamber port;
   in the discharging cycle, a gas mover fluidly coupled to the first chamber port to supply into the chamber a flow of gas containing volatile organic compounds having a first concentration, the volatile organic compounds being subjected to destructive thermal oxidation in response to thermal energy discharged by the thermochemical energy storage module so that discharge gas having a second concentration of the volatile organic compounds exits from the chamber by way of the second chamber port, wherein the second concentration is less than the first concentration;
   a flow meter and a flow valve in fluid communication with the chamber; and
   a controller coupled to the flow meter and to the flow valve to control a rate of the flow of the gas containing the volatile organic compounds based on a desired residence time for the flow of the gas.

2. The system of claim 1, wherein the residence time is in a range from 0.5 second to 30 seconds.

3. The system of claim 2, wherein the residence time is in a range from 1.0 second to 15 seconds.

4. The system of claim 1, wherein the gas mover is selected from the group consisting of a gas blower and a compressor.

5. The system of claim 1, further comprising an inlet to introduce the volatile organic compounds into the flow of gas.

6. The system of claim 5, wherein the inlet is disposed downstream of the gas mover.

7. The system of claim 1, further comprising a thermal energy source in thermal communication with the chamber to generate thermal energy in the charging cycle, wherein a suction gas mover is fluidly coupled to the first chamber port to admit into the chamber through the second chamber port a flow of gas containing volatile organic compounds having the first concentration, the volatile organic compounds being subjected to destructive thermal oxidation in response to the generated thermal energy so that discharge gas having the second concentration of the volatile organic compounds exits from the chamber by way of the first chamber port.

8. The system of claim 7, wherein the thermal energy source is an electric heater.

9. The system of claim 7, further comprising a multi-port valve having a first valve port, a second valve port and a third valve port, wherein, in the discharging cycle, the multi-port valve is operable so that the first valve port is open to pass the flow of gas to the second valve port and in turn the second valve port is open to pass the flow of gas into the chamber via the first chamber port, and the third valve port is closed.

10. The system of claim 9, wherein, in the charging cycle, the multi-port valve is operable so that the first port valve is closed, the second port valve is open and connected to the first chamber port to pass from the chamber to the third valve port a flow of discharge gas, and in turn the third valve port is connected to the suction gas mover.

11. The system of claim 1, wherein the second chamber port is connected to an inlet of a power generating apparatus to supply the discharge gas.

12. The system of claim 11, wherein the power generating apparatus is a turbomachine.

13. The system of claim 11, wherein the power generating apparatus is a thermoelectric generator.

14. The system of claim 1, wherein the flow of gas is a flow of air.

15. A system comprising:
   a thermochemical energy storage module cyclically operable in a discharging cycle and in a charging cycle, the thermochemical energy storage module having a chamber in fluid communication with a first chamber port and a second chamber port;
   in the discharging cycle, a compressor fluidly coupled to the first chamber port to supply into the chamber of the thermochemical energy storage module a flow of pressurized gas containing volatile organic compounds having a first concentration, the volatile organic compounds being subjected to destructive thermal oxidation in response to thermal energy discharged by the thermochemical energy storage module so that so that pressurized discharge gas having a second concentration of the volatile organic compounds exits from the chamber by way of the second chamber port;
   a flow meter and a flow valve in fluid communication with the chamber;

a controller coupled to the flow meter and to the flow valve to control a rate of the flow of the gas containing the volatile organic compounds based on a desired residence time for the flow of the gas;

in the charging cycle, a thermal source in thermal communication with the chamber to generate thermal energy, wherein a suction gas mover is fluidly coupled to the first chamber port to admit into the chamber through the second chamber port a flow of gas containing volatile organic compounds at the first concentration, the volatile organic compounds being subjected to destructive thermal oxidation in response to the generated thermal energy so that discharge gas having the second concentration of the volatile organic compounds exits from the chamber by way of the first chamber port; and a turbomachine connected to the second chamber port to receive the pressurized discharge gas, wherein the temperature of the pressurized discharge gas is in a range from 1000° C. to 1500° C.

16. The system of claim 15, wherein the residence time is in a range from 0.5 second to 30 seconds.

17. The system of claim 16, wherein the residence time is in a range from 1.0 second to 15 seconds.

18. The system of claim 15, wherein the thermal energy source is an electric heater.

19. The system of claim 15, further comprising an electrical generator connected to the turbomachine.

20. The system of claim 15, wherein the flow of gas is a flow of air.

* * * * *